(12) United States Patent
Fernandes et al.

(10) Patent No.: US 7,512,085 B2
(45) Date of Patent: Mar. 31, 2009

(54) METHOD FOR MULTICAST TUNNELING FOR MOBILE DEVICES

(75) Inventors: Lilian Sylvia Fernandes, Austin, TX (US); Vinit Jain, Austin, TX (US); Vasu Vallabhaneni, Austin, TX (US); Venkat Venkatsubra, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 646 days.

(21) Appl. No.: 10/875,897

(22) Filed: Jun. 24, 2004

(65) Prior Publication Data
US 2005/0286455 A1  Dec. 29, 2005

(51) Int. Cl.
- H04H 20/71 (2008.01)
- H04L 12/28 (2006.01)
- H04Q 7/00 (2006.01)
- H04Q 7/24 (2006.01)
- H04J 3/26 (2006.01)

(52) U.S. Cl. .............. 370/312; 370/390; 370/389; 370/313; 370/432; 370/338; 370/328

(58) Field of Classification Search ........... 370/312, 370/338, 328, 390, 432, 313, 392
See application file for complete search history.

(56) References Cited

U.S. PATENT DOCUMENTS

| | | | |
|---|---|---|---|
| 6,266,706 B1 * | 7/2001 | Brodnik et al. | 709/242 |
| 6,304,558 B1 * | 10/2001 | Mysore | 370/312 |
| 6,366,961 B1 * | 4/2002 | Subbiah et al. | 709/238 |
| 6,804,221 B1 * | 10/2004 | Magret et al. | 370/338 |
| 6,845,100 B1 * | 1/2005 | Rinne | 370/395.43 |
| 7,035,657 B2 * | 4/2006 | Chen et al. | 455/518 |
| 2002/0007414 A1 * | 1/2002 | Inoue et al. | 709/230 |
| 2002/0026525 A1 * | 2/2002 | Armitage | 709/238 |
| 2002/0101872 A1 * | 8/2002 | Boivie | 370/393 |

(Continued)

OTHER PUBLICATIONS

S. Deering, et al., Request for Comments No. 1883; *Internet Protocol, Version 6 (IPv6) Specification*, Dec. 1995, 24 pages.

(Continued)

*Primary Examiner*—George Eng
*Assistant Examiner*—Christopher M Brandt
(74) *Attorney, Agent, or Firm*—Williams, Morgan & Amerson, P.C.

(57) ABSTRACT

The present invention provides a method and apparatus for multicast tunneling for mobile devices. The method comprises receiving a multicast packet directed to a plurality of mobile nodes, the mobile nodes being associated with a home subnet and identifying if any of the plurality of the mobile nodes are coupled to a subnet other than the home subnet, wherein each of the identified mobile nodes has an associated transmission path through which that mobile node can be reached. The method further provides that in response to determining that at least some of the mobile nodes are coupled to the subnet other than the home subnet, determining which of the identified mobile nodes has a common next hop in their associated transmission path and generating a packet including at least a portion of the multicast packet and including in the packet a list of mobile nodes that have the common next hop. The method further provides for transmitting the generated packet to the common next hop.

9 Claims, 9 Drawing Sheets

U.S. PATENT DOCUMENTS

| | | | | |
|---|---|---|---|---|
| 2002/0129086 | A1* | 9/2002 | Garcia-Luna-Aceves et al. | 709/200 |
| 2003/0018715 | A1* | 1/2003 | O'Neill | 709/204 |
| 2003/0095523 | A1* | 5/2003 | Korus et al. | 370/338 |
| 2003/0112766 | A1* | 6/2003 | Riedel et al. | 370/252 |
| 2004/0081125 | A1* | 4/2004 | Ranta-Aho et al. | 370/335 |
| 2004/0100951 | A1* | 5/2004 | O'neill | 370/389 |
| 2004/0215799 | A1* | 10/2004 | Lehmann et al. | 709/230 |
| 2004/0218603 | A1* | 11/2004 | Lee et al. | 370/390 |
| 2004/0223465 | A1* | 11/2004 | Lee et al. | 370/313 |
| 2004/0233907 | A1* | 11/2004 | Hundscheidt et al. | 370/390 |
| 2004/0264463 | A1* | 12/2004 | Fukushima et al. | 370/390 |
| 2005/0041675 | A1* | 2/2005 | Trostle et al. | 370/401 |
| 2005/0089030 | A1* | 4/2005 | Wilson | 370/389 |
| 2005/0138369 | A1* | 6/2005 | Lebovitz et al. | 713/163 |
| 2005/0195774 | A1* | 9/2005 | Chennikara et al. | 370/338 |
| 2005/0265363 | A1* | 12/2005 | Chen | 370/401 |
| 2006/0090068 | A1* | 4/2006 | Andersen et al. | 713/160 |
| 2006/0104284 | A1* | 5/2006 | Chen | 370/395.3 |
| 2006/0182034 | A1* | 8/2006 | Klinker et al. | 370/238 |
| 2008/0117841 | A1* | 5/2008 | Chen | 370/310 |

OTHER PUBLICATIONS

Kessler, Gary C., *IPv6: The Next Generation Internet Protocol*, Feb. 1997, 12 pages.

Research Disclosure 444219, *IPv6 routing method*, Apr. 2001, 2 pages.

Research Disclosure 445117, *Fast ip-forwarding method*, May 2001, pp. 824-825.

Baratakke, et al., *Method and Apparatus for Processing Outgoing Internet Protocol Packets*, U.S. Appl. No. 10/165,084, filed Jun. 6, 2002, 29 pages.

Dai, et al., *Method and Apparatus for Transmitting Wake-Up Packets Over a Network Data Processing System*, U.S. Appl. No. 10/455,156, filed Jun. 5, 2003, 30 pages.

Banerjee, et al., *Method and Apparatus for Managing Keepalive Transmissions*, U.S. Appl. No. 10/607,460, filed Jun. 26, 2003, 39 pages.

Brown, et al., Method and Apparatus for Managing a Remote Data Processing System, U.S. Appl. No. 10/614,629, filed Jul. 3, 2003, 31 pages.

Brown, et al., System and Method of Reducing Data Corruption Due to Recycled IP Identification Numbers, U.S. Appl. No. 10/631,064, filed Jul. 31, 2003, 33 pages.

Banerjee, et al., Method, System and Article for Rapid Detection and Avoidance of High Data Corrupting Routes Within a Network, U.S. Appl. No. 10/640,819, filed Aug. 14, 2003, 52 pages.

Aguilar, et al., System and Method for Processor Dedicated Code Handling in a Multi-Processor Environment, U.S. Appl. No. 10/670,836, filed Sep. 25, 2003, 122 pages.

Deanna Brown, et al., Method and Apparatus to Reactivate TCP Connection with Sleeping Peers, U.S. Appl. No. 10/682,395, filed Oct. 9, 2003, 26 pages.

Banerjee, et al., Efficient Packet Desegmentation on a Network Adapter, U.S. Appl. No. 10/687,235, filed Oct. 16, 2003, 35 pages.

Jain, et al., Method, System and Article for Router-Assisted Fast Processing of Packet Termination in Hosts, U.S. Appl. No. 10/703,013, filed Nov. 6, 2003, 26 pages.

* cited by examiner

METHOD FOR MULTICAST TUNNELING FOR MOBILE DEVICES

BACKGROUND OF THE INVENTION

1. Field of the Invention

The invention generally relates to network communications, and, in particular, to a method and apparatus for multicast tunneling for mobile devices.

2. Description of the Related Art

Mobile IPv6 (MIPv6) is a protocol developed as a subset of Internet Protocol version 6 (IPv6) to support mobile connections. MIPv6 is an update of the IETF (Internet Engineering Task Force) Mobile IP standard (RFC 2002) designed to communicate with mobile devices (known as mobile nodes) using IPv6 addresses.

In traditional IP routing, IP addresses represent a topology. Routing mechanisms rely on the assumption that each network node will always have the same point of attachment to the Internet, and that each node's IP address identifies the network link where it is connected. In this routing scheme, a person desiring to disconnect a mobile device from the Internet and then to reconnect it through a different network would have to configure the device with a new IP address, the appropriate netmask, and default router. Otherwise, routing protocols may not have a means of delivering datagrams (packets), because the device's network address does not contain the necessary information about the node's network point of attachment to the Internet.

MIPv6 allows a mobile node to transparently maintain connections while moving from one subnet to another. Each device is identified by its home address although it may be connecting through another network. When connecting through a foreign network, a mobile device sends its location information to a home agent. The home agent intercepts packets that are intended for the mobile node and tunnels them to the mobile node's current location. The mobile node also typically informs the correspondent node about its new location, so that only the first few packets are tunneled through the home agent.

MIPv6 specifies that multicast packets addressed with a global scope to which the mobile node has successfully subscribed must be tunneled to the mobile node. Because multicast packets are addressed to a group of hosts, these packets are tunneled through the home agent—that is, the correspondent node does not learn about the possible new locations of every member of the group. As such, the home agent must separately tunnel multicast packets for each of the mobile nodes to their new location. This, however, can be inefficient, giving rise to network traffic, particularly if a large number of network nodes move to a foreign network. Moreover, if the network nodes happen to move to a common part of a network, the home agent will transmit multiple packets to those nodes in the same direction, thereby possibly congesting the network path.

The present invention is directed to addressing, or at least reducing, the effects of, one or more of the problems set forth above.

SUMMARY OF THE INVENTION

In one aspect of the instant invention, a method is provided for multicast tunneling for mobile devices. The method comprises receiving a multicast packet directed to a plurality of mobile nodes, the mobile nodes being associated with a home subnet and identifying if any of the plurality of the mobile nodes are coupled to a subnet other than the home subnet, wherein each of the identified mobile nodes has an associated transmission path through which that mobile node can be reached. The method further provides that in response to determining that at least some of the mobile nodes are coupled to the subnet other than the home subnet, determining which of the identified mobile nodes has a common next hop in their associated transmission path and generating a packet including at least a portion of the multicast packet and including in the packet a list of mobile nodes that have the common next hop. The method further provides for transmitting the generated packet to the common next hop.

In another aspect of the instant invention, an apparatus is provided for multicast tunneling for mobile devices. The apparatus comprises an interface communicatively coupled to a control unit. The control unit is adapted to receive a multicast packet over the interface directed to a plurality of mobile nodes, the mobile nodes being associated with a home subnet, and identify if any of the plurality of mobile nodes are coupled to a subnet other than the home subnet, wherein each of the identified mobile nodes can be reached through its respective transmission path. The control unit further generates a packet including at least a portion of the multicast packet and including a list of the identified mobile nodes that have a common next hop in their transmission path and transmit the generated packet to the common next hop.

In yet another aspect of the instant invention, an article comprising one or more machine-readable storage media containing instructions is provided for multicast tunneling for mobile devices. The instructions, when executed, enable a processor to receive a multicast packet directed to a plurality of mobile nodes, the mobile nodes being associated with a home subnet and identify if any of the plurality of the mobile nodes are coupled to a subnet other than the home subnet, wherein each of the identified mobile nodes can be reached through its respective transmission path. The instructions further enable the processor to generate a packet including at least a portion of the multicast packet and including a list of the identified mobile nodes that have a common next hop in their transmission path and transmit the generated packet to the common next hop.

In yet another aspect of the instant invention, an article comprising one or more machine-readable storage media containing instructions is provided for multicast tunneling for mobile devices. The article comprising one or more machine-readable storage media containing instructions that when executed enable a processor to receive a packet including a multicast packet and a list of a plurality of mobile nodes to which the multicast packet should be delivered, wherein each of the mobile nodes is reachable through its respective transmission path and determine if the plurality of mobile nodes has a common next hop in their transmission path. The instructions further enable a processor to transmit the received packet to the common next hop in response to determining that the plurality of mobile nodes has the common next hop.

In one aspect of the instant invention, a method is provided for multicast tunneling for mobile devices. The method comprises receiving a packet including a multicast packet and a list of a plurality of mobile nodes to which the multicast packet should be delivered, wherein each of the mobile nodes is reachable through its respective transmission path and determining if the plurality of mobile nodes has a common next hop in their transmission path. The method further comprises transmitting the received packet to the common next hop in response to determining that the plurality of mobile nodes has the common next hop.

In one aspect of the instant invention, a router is provided for multicast tunneling for mobile devices. The router comprises an interface and a control unit. The control unit is adapted to receive a packet including a multicast packet and a list of a plurality of mobile nodes to which the multicast packet should be delivered, wherein each of the mobile nodes is reachable through its respective transmission path and determine if the plurality of mobile nodes has a common next hop in their transmission path. The control unit is further adapted to transmit the received packet to the common next hop in response to determining that the plurality of mobile nodes has the common next hop.

In yet another aspect of the instant invention, an article comprising one or more machine-readable storage media containing instructions is provided for multicast tunneling for mobile devices. The instructions, when executed, enable a processor to receive a packet including a multicast packet and a list of a plurality of mobile nodes to which the multicast packet should be delivered, wherein each of the mobile nodes is reachable through its respective transmission path and determine if the plurality of mobile nodes has a common next hop in their transmission path. The instructions further enable the processor to transmit the received packet to the common next hop in response to determining that the plurality of mobile nodes has the common next hop.

BRIEF DESCRIPTION OF THE DRAWINGS

The invention may be understood by reference to the following description taken in conjunction with the accompanying drawings, in which like reference numerals identify like elements.

Figure 1A:
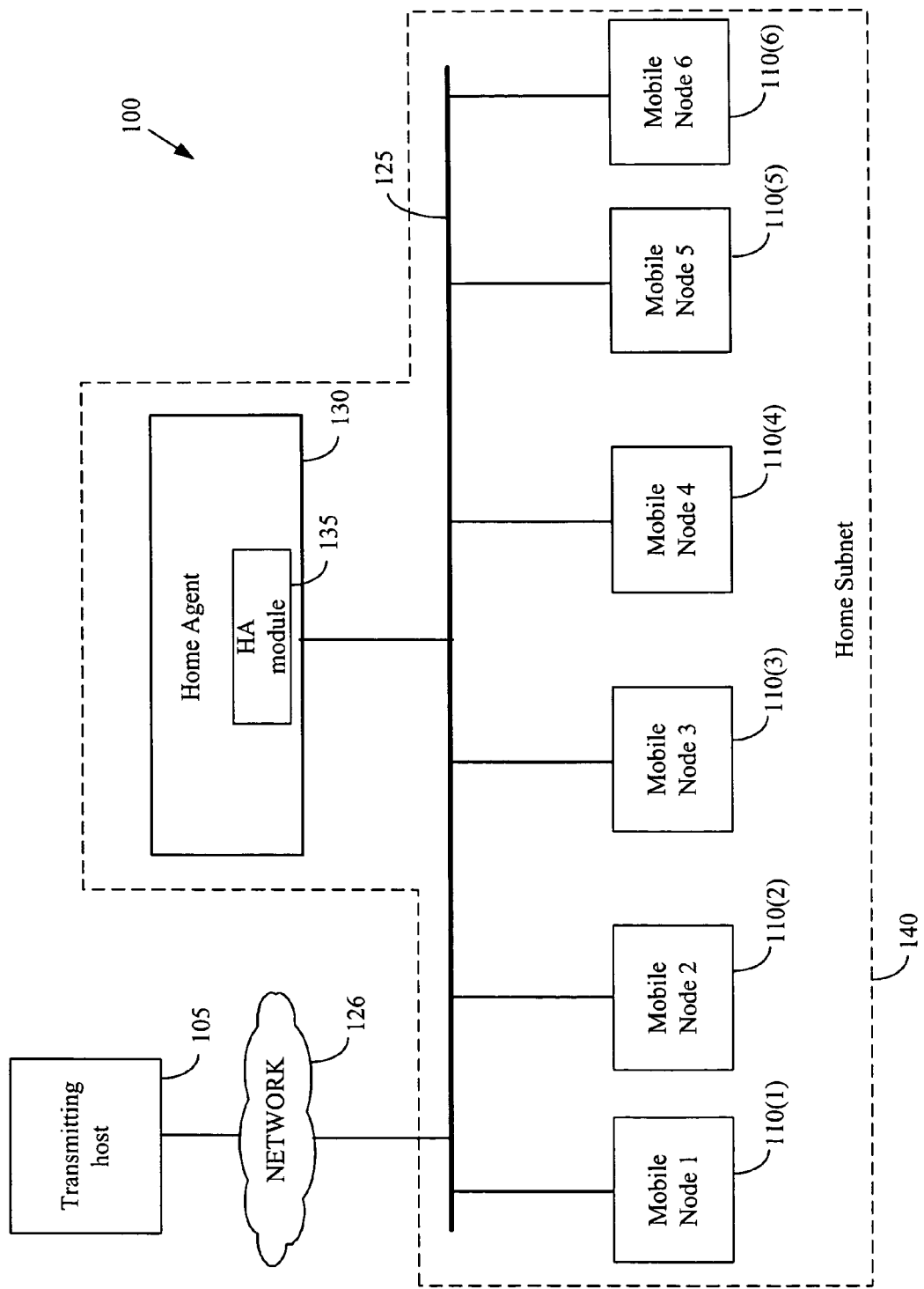
FIGS. 1A-B are block diagrams of a communications system, in accordance with one embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Referring to FIG. 1A, a communications system 100 is illustrated in accordance with one embodiment of the present invention. The various devices of the communications system 100 in FIG. 1A may communicate with each other using a variety of network protocols, including the Internet Protocol/Transport Control Protocol (TCP/IP). Although not so limited, the present invention is described in the context of communications occurring according to Internet Protocol (version 6) and Mobile IPv6 (MIPv6). One version of IP (IPv6) is described in RFC 2460, entitled "Internet Protocol, Version 6 (IPv6) Specification," dated December 1998, and one version of MIPv6 is described in an Internet draft documented entitled "Mobility Support in IPv6," dated Jun. 30, 2003. The contents of the IPv6 specification and the MIPv6 draft are incorporated herein by reference in their entirety.

The communications system 100 includes a transmitting host 105 and one or more mobile nodes 110(1-6). The mobile nodes 110(1-6) may be communicatively coupled to each other by a network 125, and the transmitting host 105 may be communicatively coupled to the network 125 through another network 126. A "mobile node" is a node that can change its point of attachment from one link to another, while still being reachable via its home address. Thus, each mobile node 110 can be identified by its home address regardless of its current point of attachment to the network 125. In the illustrated embodiment of the communications system 100, the mobile nodes 110(1-6) are each associated with a home agent 130. When connecting through a foreign network, a mobile node 110 sends its location information (i.e., care-of address) to a home agent 130. A "home agent" may, for example, be a router on the mobile node's home subnet with which the mobile node has registered its current care-of address. Generally, while a mobile node 110 is away from home (i.e., attached to a foreign link or network), the home agent 130 intercepts packets on the home address, encapsulates them, and tunnels them to the mobile node's registered care-of address.

Although not so limited, for illustrative purposes, it is assumed that the home agent 130 and the various mobile nodes 110(1-6) belong to the same subnet 140 (short for subnetwork), which may be part of the larger network 125. The subnet 140 in the illustrated embodiment is assumed to be the home subnet of the various mobile nodes 110(1-6). The term "subnet," as utilized herein, refers to an identifiably separate part of a larger network. Thus, a "sub-net" may refer to at least a portion of one or more communications networks, channels, links, or paths, and systems or devices (such as routers) used to route data over networks, channels, links, or paths.

The home agent 130 includes a home agent (HA) module 135 that operates in accordance with one or more embodiments of the present invention. As described in greater detail below, the HA module 135 efficiently forwards multicast packets received from a host, such as the transmitting host 105, to the mobile nodes 110(1-6) that are away from the home subnet 140. In one embodiment, the multicast packets are encapsulated in an IP header by the HA module 135 and addressed to the new location of the mobile node 110.

Figure 1B:
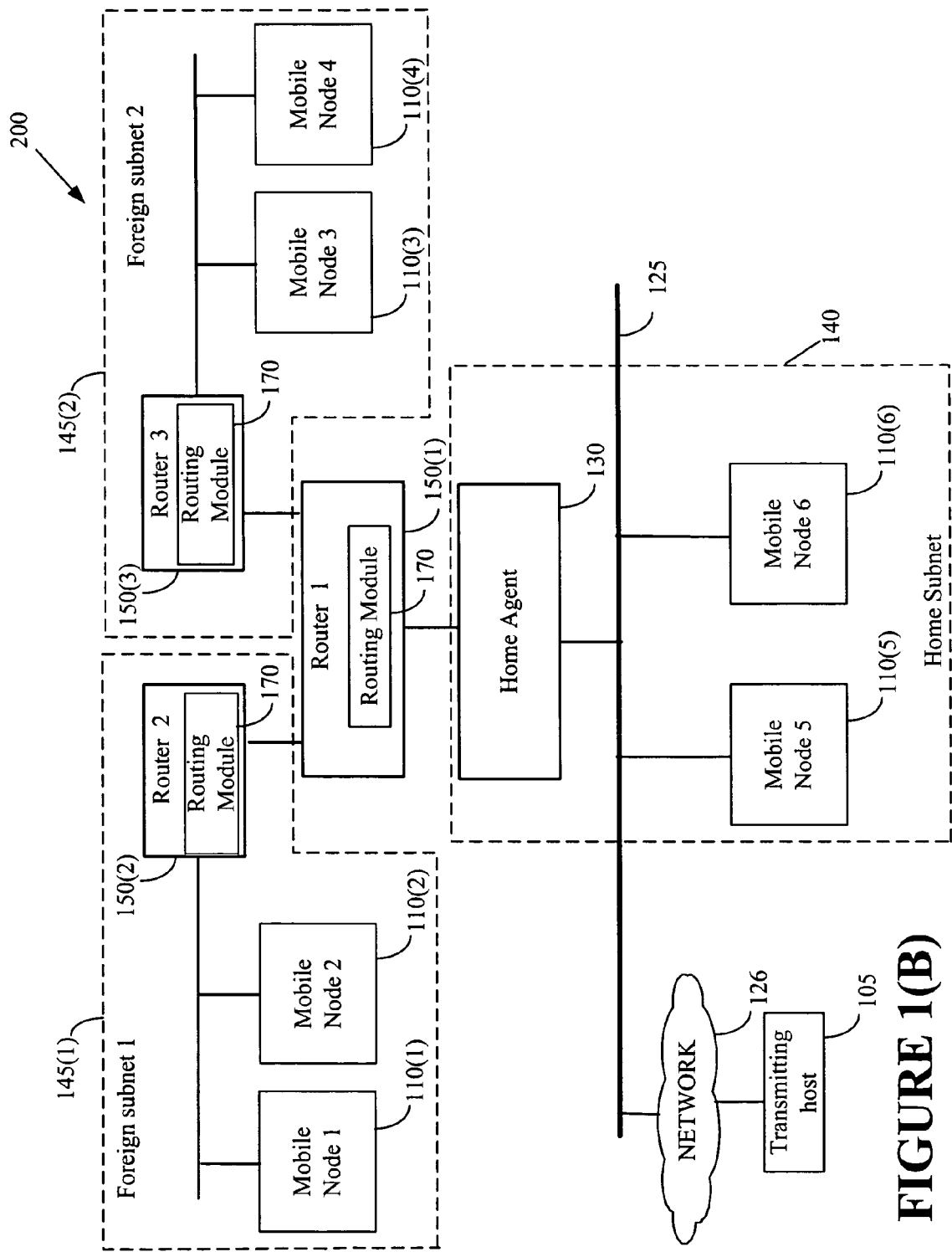

FIG. 1B illustrates an exemplary arrangement (shown as communications system 200) in which some of the mobile nodes 110 of the communications system 100 of FIG. 1A have moved away from their home subnet 140 to various other, foreign subnets 145(1-2). In the illustrated embodiment, the first mobile node 110(1) and the second mobile node 110(2) are now associated with the first foreign subnet 145(1), and the third mobile node 110(3) and the fourth mobile node 110(4) are associated with the second foreign subnet 145(2). As mentioned, when connecting through foreign subnets 145(1-2), each of the mobile devices 110(1-4) sends its location information (i.e., care-of address) to the home agent 130 through which the home agent 130 can thereafter communicate with the mobile devices 110(1-4).

The communications system 200 of FIG. 1B includes a plurality of routers 150(1-3), each of which can include a routing module 170 that processes encapsulated multicast packets transmitted by the HA module 135 and forwards the packets for delivery to the appropriate mobile nodes 110(1-6), whether they are connected to the home subnet 140 or to a foreign subnet 145. For illustrative purposes, the exemplary arrangement of the communications system 200 of FIG. 1B includes the home agent 130 coupled to the first router 150(1), which is further coupled to both the second router 150(2) and the third router 150(3). The second router 150(2), which is shown to belong to the first foreign subnet 145(1), is in turn coupled to the first mobile node 110(1) and the second mobile node 110(2). The third router 150(3), which is shown to belong to the second foreign subnet 145(2), is coupled to the third mobile node 110(3) and the fourth mobile node 110(4).

It should be appreciated that the arrangement of the communications systems 100 and 200 of FIGS. 1A-B are exemplary in nature and that, in alternative embodiments, these systems 100, 200 may have other arrangements. For example, the systems 100, 200 may include any desirable number of transmitting hosts, such as the transmitting host 105, any desirable number of routers (e.g., routers 150(1-3)), and any desirable number of mobile nodes 110. The transmitting host 105 and the mobile node 110 may be any suitable type of processor-based device, such as a desktop computer, laptop computer, mainframe, portable device, kiosk, or other device including a processor.

The various modules 135 (see FIG. 1A) and 170 (see FIG. 1B) are implemented in software, although in other implementations these modules may also be implemented in hardware or a combination of hardware and software. In one embodiment, each module 135 and 170 may comprise a plurality of modules, with each of the plurality of modules capable of performing one or more desired acts.

Figure 2:
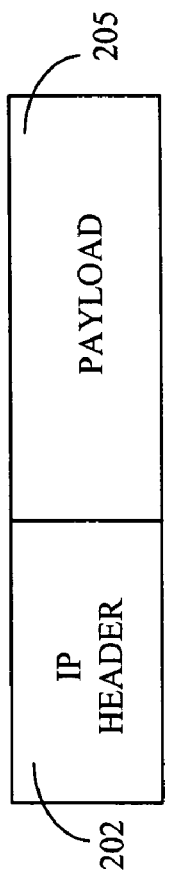
FIG. 2 is a format of an IP packet that may be employed in the communications system of FIGS. 1A-B, in accordance with one embodiment of the present invention.

As stated, the communications systems 100, 200 employ the IPv6 protocol, although other protocols may also be employed in alternative embodiments. For a proper perspective, a representative IPv6 data packet 200 is shown in FIG. 2. The data packet 200 includes an IP header 202 and a payload portion 205. The IP header 202 generally contains control information about how the IP packet 200 can be delivered from its source to its destination. One embodiment of the IP header 202 is shown in FIG. 3.

Figure 3:
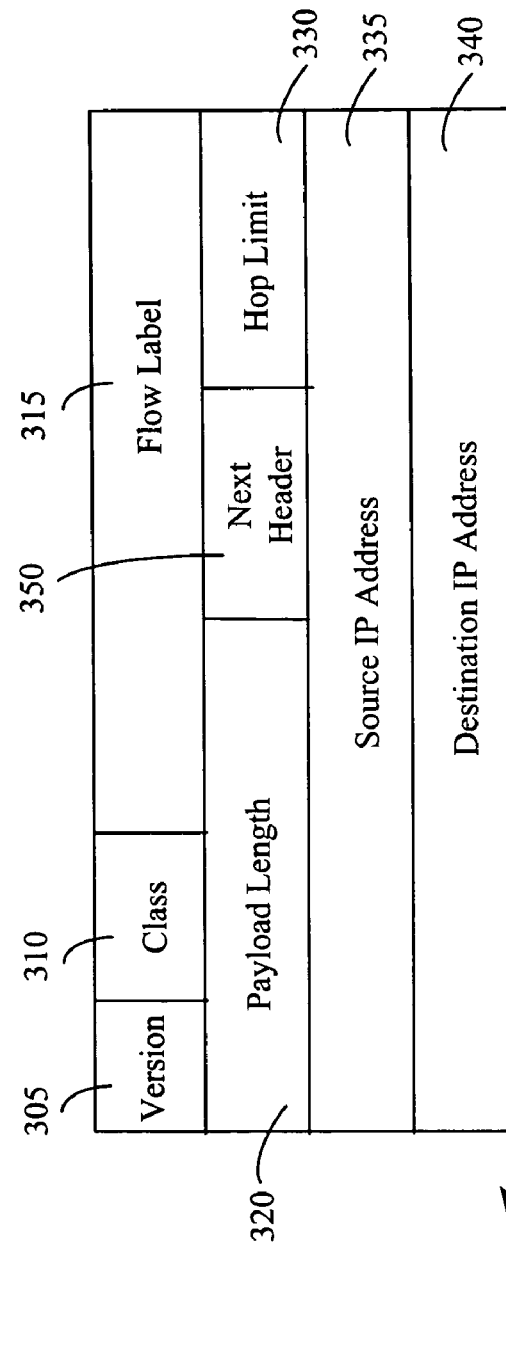
FIG. 3 depicts a format of a header of the IP packet of FIG. 2.

As shown in FIG. 3, the IP header 202 includes a version field 305 that indicates the version of IP associated with the IP packet 200 (see FIG. 2). The IP header 202 may also include a class field 310 and a flow label field 315 for Quality of Service (QoS). The class field 310 allows the originating host or the forwarding router to identify the class or priority of the packet. The flow label field 315 allows the source host to label a sequence of packets (i.e., a flow) that requires special handling by intermediate routers when the packets travel from source to destination. A QoS protocol such as Resource Reservation Setup Protocol (RSVP) can use the Class and Flow control fields to conduct special handling, such as realtime video transmission. The IP header 202 further includes a payload length field 320 that specifies the length of the data the IP packet 200 carries after the IP header 202. The IP header 202 includes a hop limit field 330 that can be utilized to express a packet's time-to-live in terms of hops.

The IP header 202 includes a source IP address field 335 that specifies a sending node (e.g., transmitting host 105), and a destination IP address field 340 that specifies a receiving node (e.g., mobile node 110). Of course, for instances in which data originates from the mobile node 110 and is directed to the host 105, the mobile node 110 becomes the source and the host 105 becomes the destination. As such, in these instances, the address of the mobile node 110 is stored in the source IP address field 335, and the address of the transmitting host 105 is stored in the destination IP address field 340. The IP packet 200 may be designated as a "multicast" packet, in one embodiment, based on the value stored in the destination IP address field 340. For example, an IP address beginning with a "FF0E" (hex) prefix may indicate that the IP packet 200 is a multicast packet that is addressed with a global scope.

The IP header 202 includes a next header field 350 that allows insertion of extension headers between the header 202 and the payload portion 205 of the data packet 200. Each extension header other than the transport header (such as the TCP header) can include its own next header field 350 that specifies the following header's type, forming a daisy chain of IP headers 202. IPv6 currently defines seven extension headers: Hop-by-Hop Options, Destination Options, Routing, Fragment, Authentication, and Encapsulating Security Payload, and Mobility Header.

The manner in which the HA module 135 of FIG. 1A efficiently handles multicast packets is described in greater detail below. In general, the HA module 135 takes advantage of the notion that the home agent 130 has a list of all of the mobile nodes 110 to which the packets must be tunneled. In one embodiment, instead of sending a separate multicast packet for each mobile node 110 that is away from the subnet, the HA module 135 and the routing module 170 attempt to transmit a common packet to the mobile nodes 110 as far along the path as possible before individual packets are forwarded to the mobile nodes 110(1-4). The HA module 135 encapsulates the original multicast packet in a new packet that includes a hop-by-hop extension header with a multi-destination list stored therein. A multi-destination list may include an identifier (such as an IP address or foreign IP address or care-of address) for one or more of the mobile nodes 110 to which a multicast packet should be delivered.

Figure 4:
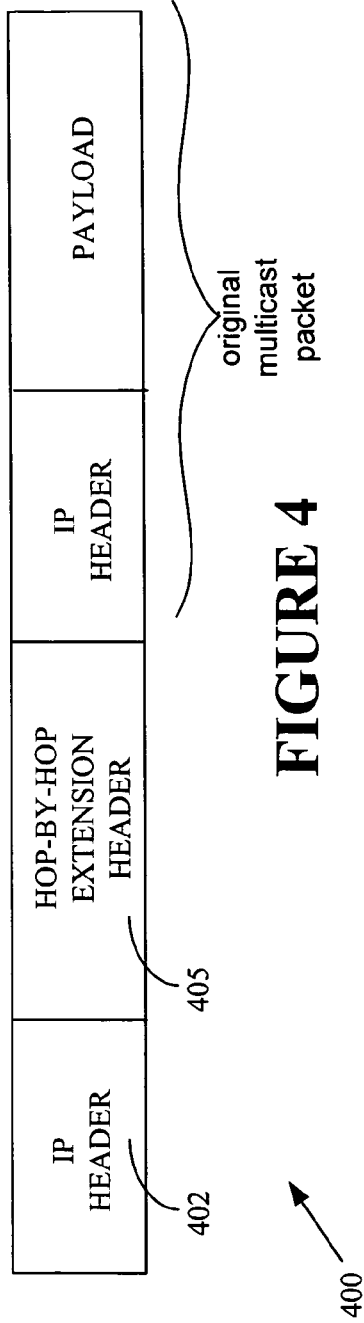
FIG. 4 illustrates one format of an encapsulated IP packet with an extension header that can be employed in the communications system of FIGS. 1A-B, in accordance with one embodiment of the present invention.

One embodiment of the encapsulated packet 400 that can be generated by the HA module 135 is shown in FIG. 4. The packet 400 in FIG. 4 includes an IP header 402 with a hop-by-hop extension header 405 (i.e., the "next header" field 350 (see FIG. 3) specifies "a hop-by-hop" extension header). In the illustrated embodiment, the multi-destination list is stored in the hop-by-hop extension header 405, which is a field that, if present in an IP packet, is accessed and processed by the various intermediate routers 150(1-3) along the transmission path. A destination IP address field 340 of the IP header 402 includes the IP address of the new location of a given mobile node 110(1-4). The encapsulated packet 400 includes the original multicast packet.

Figure 5:
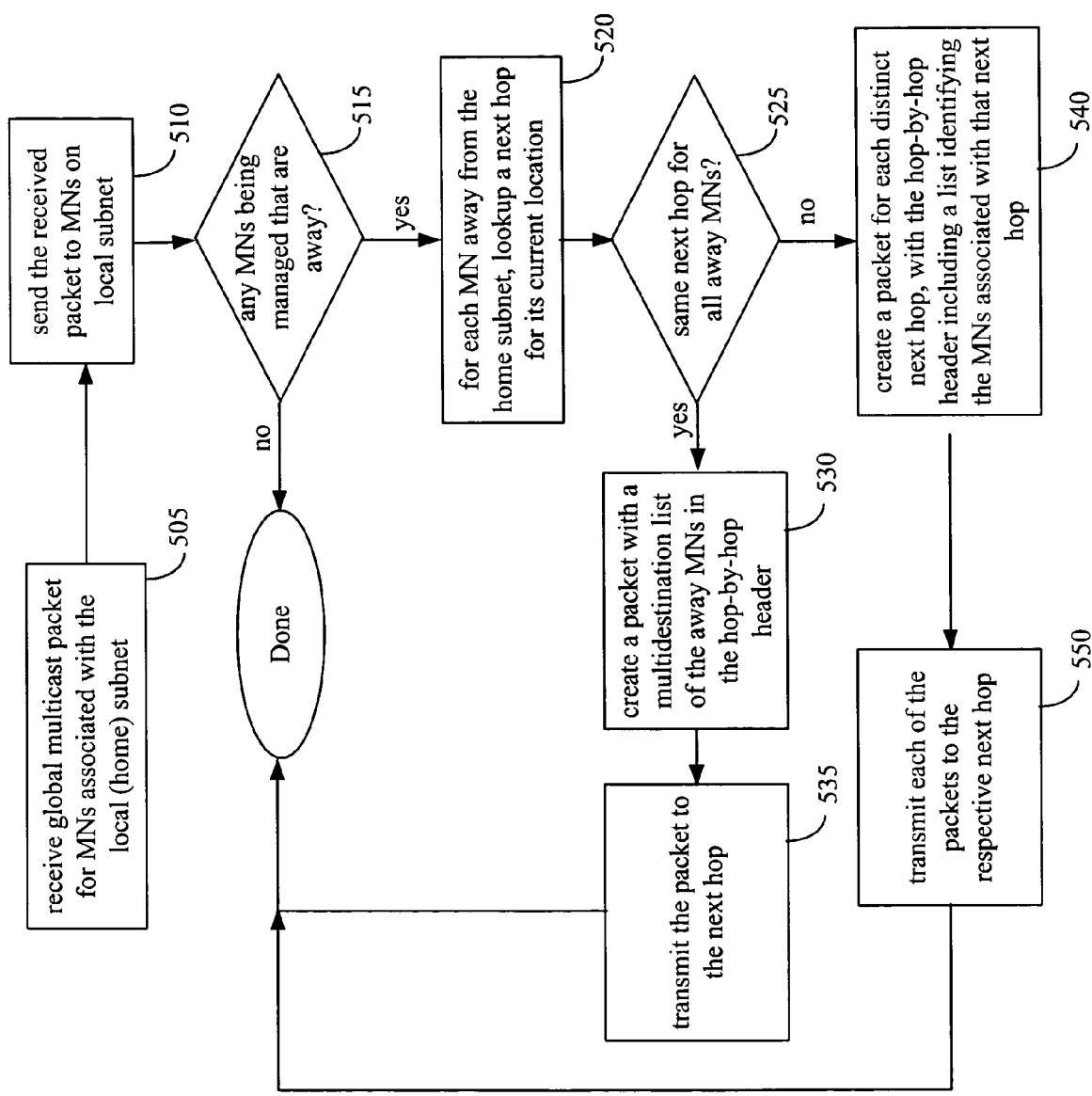
FIG. 5 illustrates a flow diagram of a home agent module that may be implemented in the communications system of FIGS. 1A-B, in accordance with one embodiment of the present invention.

Referring now to FIG. 5, a flow diagram of one aspect of the HA module 135 of FIG. 1A is illustrated, in accordance with one embodiment of the present invention. For illustrative purposes, the flow diagram of FIG. 5 is described in the context of FIG. 1B, where the transmitting host 105 sends a multicast packet to the mobile nodes 110(1-6), some of which are relocated on the foreign subnets 145(1-2). Additionally, for clarity, in the process of describing the flow diagram of FIG. 5, occasional references are made to a message flow diagram shown in FIGS. 6A-B.

Figure 6A:
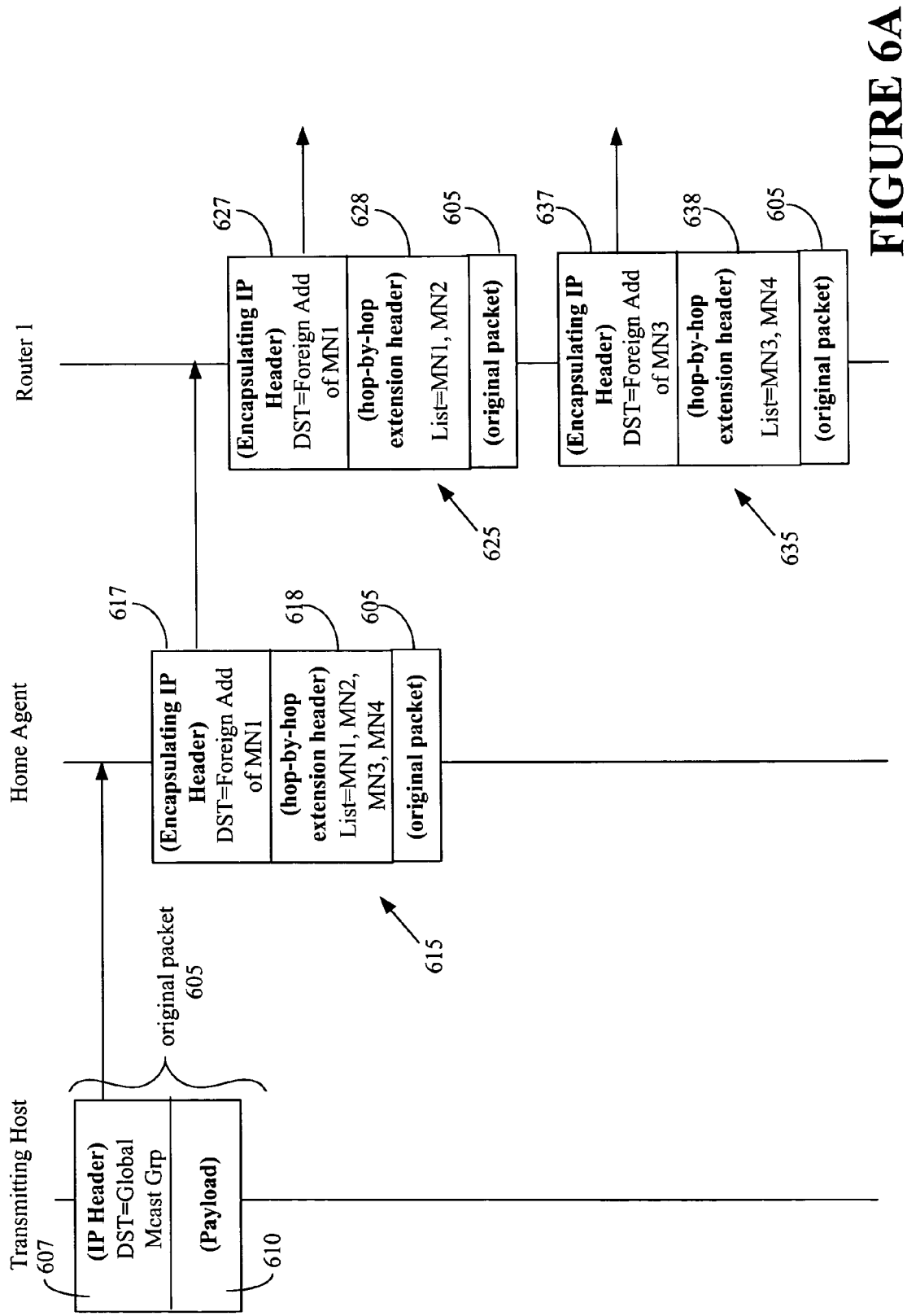
FIGS. 6A-B illustrate a message flow diagram of a multicast packet in the communications system of FIGS. 1A-B, in accordance with one embodiment of the present invention.

In FIG. 5, the HA module 135 receives (at 505) the global multicast packet sent by the transmitting host 105 that is intended for the various mobile nodes 110 associated with the local (home) subnet 140. The multicast packet may take the form of the IP packet 200 shown in FIG. 2. FIG. 6A illustrates an exemplary multicast packet 605 that is transmitted by the transmitting host 105 and received by the home agent 130. The illustrated multicast packet 605 in FIG. 6A includes an IP header 607 and a payload section 610.

The HA module sends (at 510) the received packet to all of the mobile nodes 110 that are connected to the local (or home) subnet 140. In the illustrated example of FIG. 1B, because the fifth mobile node 110(5) and the sixth mobile node 110(6) are connected to the local subnet 140, the HA module 135 sends (at 510) the multicast packet 605 (see FIG. 6A) to the fifth and sixth mobile nodes 110(5-6). Because the received packet is a multicast packet, the HA module 135 also needs to forward the multicast packet 605 to the remaining mobile nodes 110 (1-4), which in FIG. 1B are located on the foreign subnets 145(1-2). The manner in which the multicast packet 605 is forwarded to these mobile nodes 110(1-4) is described below.

In FIG. 5, the HA module 135 determines (at 515) if any of the mobile nodes 110 that it manages are away from the home subnet 140 (i.e., on a foreign network 145). Because the MIPv6 specifies that each mobile node 110 transmit its new destination address (or foreign address) to the home agent 130, the home agent 130 is typically aware of the whereabouts of the mobile nodes 110(1-6) that are associated with it. If none of the mobile nodes 110 are away from the home subnet 140, then that is an indication that the multicast packet has been delivered to all the destinations. If it is determined (at 515) that one or more mobile nodes 110 are away from the home subnet 140, the HA module 135 determines (at 520) a next hop of the router (or transmission path) for each mobile node 110 that is away from the home subnet 140. In the context of FIG. 1B, as noted, the first, second, third, and fourth mobile nodes 110(1-4) are away from the home subnet 140. The route from the home agent 130 to the first and second mobile nodes 110(1-2) comprises the first router 150(1) and the second router 150(2), and the router from the home agent 130 to the third and fourth mobile nodes 110(3-4) comprises the first router 150(1) and the third router 150(3). Thus, in FIG. 1B, the next hop for all of the mobile nodes 110(1-4) is the first router 150(1).

The HA module 135 determines (at 525) if the next hop is the same for all of the mobile nodes 110(1-4) away from the home subnet 140. If the next hop is the same, the HA module 135, instead of sending multiple multicast packets to the mobile nodes 110(1-4) away from the home subnet 140, the HA module 135 tunnels a common packet to the next hop. In this case, the act of tunneling comprises creating (at 530) a packet that includes a multi-destination list of the away mobile nodes 110(1-4) and then transmitting (at 535) that packet to the next hop. In one embodiment, the HA module 135 creates (at 530) the packet by encapsulating the original (multicast) packet received (at 505) in an IP header addressed to the new location of the mobile nodes 110(1-4). As noted, the multi-destination list of the mobile nodes 110(1-4) that are away from the home subnet 140 is transmitted as part of an extension header, in particular, in a hop-by-hop extension header. Thus, as part of encapsulating the original packet, the HA module 135 includes a hop-by-hop extension header that contains a list of all of the away mobile nodes 110(1-4) to which the multicast packet is to be sent. One exemplary packet that is created (at 530) is shown in FIG. 6A as packet 615, which includes a header 617, an extension header 618, and the original multicast packet 605. The destination address field 340 (see FIG. 3) of the IP header 617 can include the foreign address (e.g., care-of address) of any of the mobile nodes 110(1-4) because they all share the same next hop in the illustrated example of FIG. 1B. The extension header 618 includes the destination list of the mobile nodes 110(1-4) to which the multicast packet 605 is to be delivered.

In FIG. 5, if it is determined (at 525) that the next hop is not the same for all of the mobile nodes 110(1-4) away from the home subnet 140, the HA module 135, for each distinct next hop, creates (at 540) a packet with a hop-by-hop extension header including a list identifying each mobile node 110(1-4) that is associated with that next hop. The HA module 135 can transmit (at 550) each of the created packets to the respective next hop.

Figure 6B:
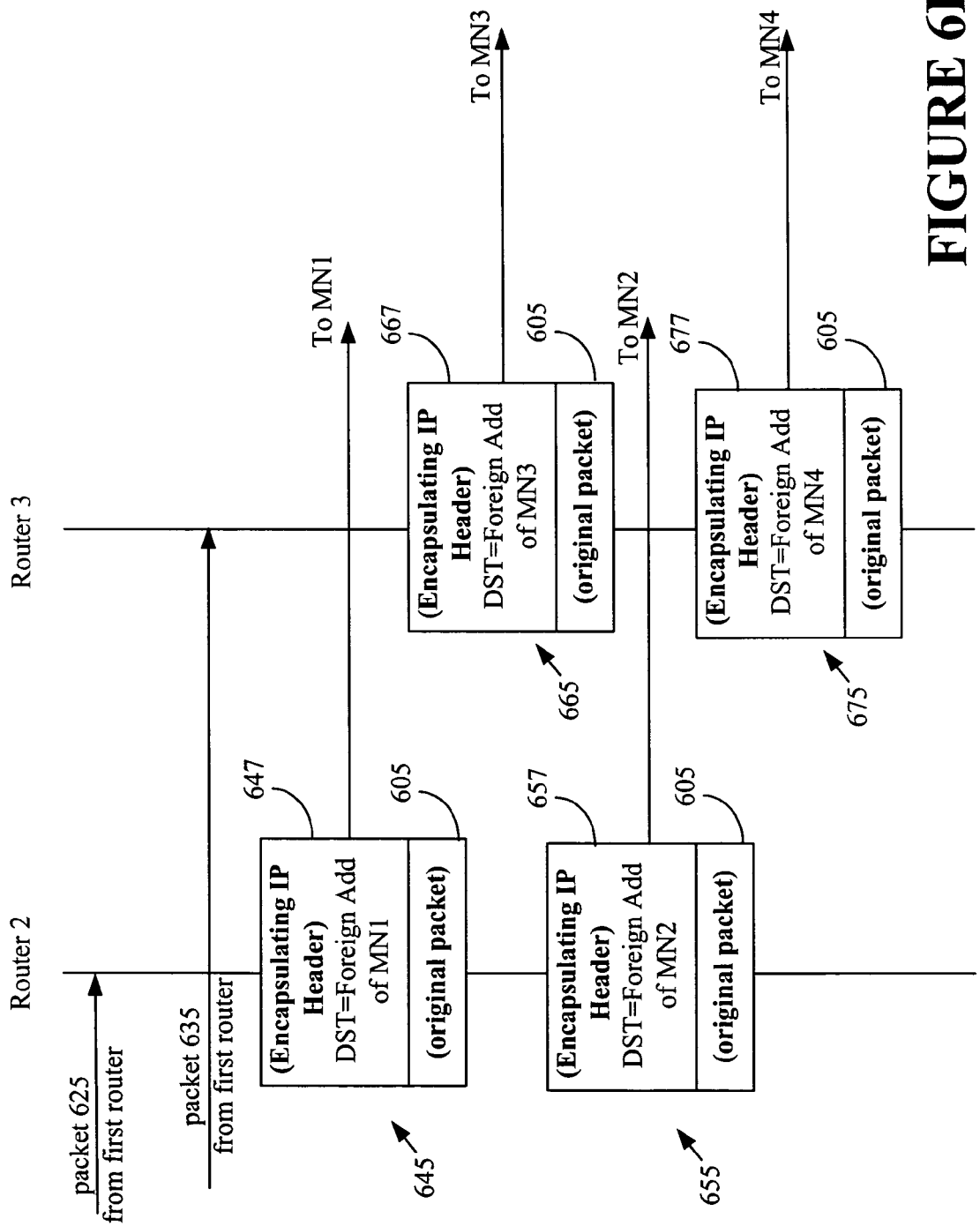
Figure 7:
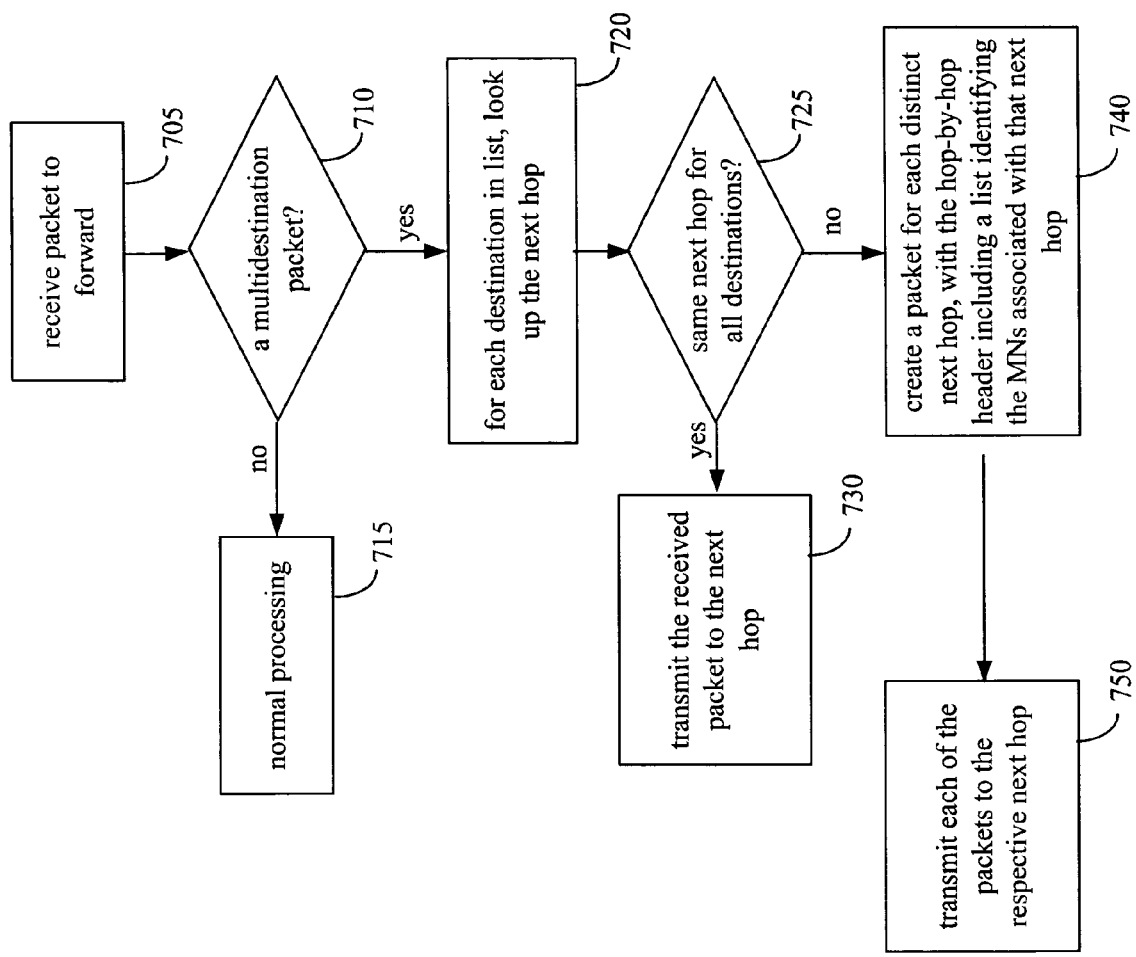
FIG. 7 illustrates a flow diagram of a routing module that may be implemented in the communications system of FIGS. 1A-B, in accordance with one embodiment of the present invention.

Referring now to FIG. 7, a flow diagram of one aspect of the routing module 170 of FIG. 1B is illustrated, in accordance with one embodiment of the present invention. For illustrative purposes, the flow diagram of FIG. 7 is described in the context of FIG. 1B, where the routers 150(1-3) receive and process the encapsulated packet 615 (see FIG. 6A) transmitted by the home agent 130. Additionally, for clarity, in the process of describing the flow diagram of FIG. 7, occasional references are made to the message flow diagram shown in FIGS. 6A-B. The flow diagram of FIG. 7 is first described from the perspective of the first router 150(1).

In FIG. 7, the routing module 170 of the first router 150(1) receives (at 705) the encapsulated packet 615 (see FIG. 6A) transmitted by the home agent 130. The routing module 170 of the first router 150(1) determines (at 710) if the received packet is a multi-destination packet. This may be accomplished, in one embodiment, by determining if the received packet 615 includes a list of mobile node(s) 110 in the hop-by-hop extension header 618 (see FIG. 6A). If it is determined (at 710) that the received packet is not a multi-destination packet, the HA module 135 processes (at 715) the received packet in the usual manner.

If the received packet is a multi-destination packet, the HA module 135, for each destination (or mobile node 110) in the list, determines (at 720) the next hop in the transmission path for that destination. Thus, in the context of FIG. 6A, because the received packet 615 includes four destinations listed in the hop-by-hop extension header 618, the HA module 135 determines (at 720) the next hop for the first mobile node 110(1), the second mobile node 110(2), the third mobile node 110(3), and the fourth mobile node 110(4). As shown in FIG. 1B, the next hop for the first and second mobile nodes 110(1-2) is the second router 150(2), and the next hop for the third and fourth mobile nodes 110(3-4) is the third router 150(3).

The HA module 135 determines (at 725) if the next hop is the same for all of the mobile nodes 110(1-4) away from the home subnet 140. If the next hop is the same, the HA module 135 transmits (at 730) the received packet to the next hop. If the next hop is not the same for all of the mobile nodes 110(1-4), the routing module 170, for each distinct next hop, creates (at 740) a packet with a hop-by-hop extension header including a list identifying each mobile node 110 that is associated with that next hop. In FIG. 1B, the next hop is not the same for all of the mobile nodes 110(1-4)—the second router 150(2) is the next hop for the first and second mobile nodes 110(1-2), and the third router 150(3) is the next hop for the third and fourth mobile nodes 110(3-4). Thus, in the context of FIG. 1B, the routing module 170 of the first router 150(1) creates (at 740) a first packet 625 (see FIG. 6A) that is intended for the first and second mobile nodes 110(1-2), and creates (at 740) a second packet 635 (see FIG. 6A) that is intended for the third and fourth routers 110(3-4).

The first packet 625 of FIG. 6A includes a header 627, an extension header 628, and the original multicast packet 605. The destination address field 340 (see FIG. 3) of the IP header 627 can include the foreign address (e.g., care-of address) of either the first or the second mobile node 110(1-2) because each shares the same next hop (e.g., the second router 150(2)) in the illustrated example of FIG. 1B. The extension header 628 includes the destination list of the first and second mobile nodes 110(1-2) to which the multicast packet 605 is to be delivered. The second packet 635 created by the first router 150(1) includes a header 637, an extension header 638, and the original multicast packet 605. The destination address field 340 (see FIG. 3) of the IP header 637 can include the foreign address (e.g., care-of address) of either the second or the third mobile node 110(3-4) because each shares the same next hop (e.g., the third router 150(3)) in the illustrated example of FIG. 1B. The extension header 638 includes the destination list of the third and fourth mobile nodes 110(3-4) to which the multicast packet 605 is to be delivered.

In FIG. 7, the routing module 170 of the first router 150(1) transmits (at 750) each of the packets to the respective next hop. For example, as shown in FIGS. 6A-B, the first packet 625 is forwarded to the second router 150(2) and the second packet 635 is forwarded to the third router 150(3).

The flow diagram of FIG. 7 can be performed by the routing module 170 of each of the other intermediate routers 150(2-3) until the multicast packet 605 (see FIG. 6A) reaches its ultimate destinations. As shown in the message flow diagram of FIG. 6B, the second router 150(2), upon receiving the first packet 625 from the first router 150(1), generates a first packet 645 for delivery to the first mobile node 110(1), and generates a second packet 655 for delivery to the second mobile node 110(2). The first packet 645 includes a header 647 with the destination address of the first mobile node 110(1) stored in the header 647 and further includes the original multicast packet 605. Similarly, the second packet 655 includes a header 657 with the destination address of the second mobile node 110(2) stored in the header 657 and further includes the original multicast packet 605. Because the first and second mobile nodes 110(1-2) are each coupled to the second router 150(2), there is no need to include a multi-destination field in a hop-by-hop extension header. As such, the routing module 170 of the second router 150(2) can deliver the first packet 645 and the second packet 655 respectively to the first and second mobile nodes 110(1-2).

Similar to the second router 150(2), the routing module 170 of the third router 150(3), upon receiving the packet 635 from the first router 150(1), generates a first packet 665 for delivery to the third mobile node 110(3), and generates a second packet 675 for delivery to the fourth mobile node 110(4). The first packet 665 includes a header 667 with the destination address of the third mobile node 110(3) stored in the header 667 and further includes the original multicast packet 605. Similarly, the second packet 675 includes a header 677 with the destination address of the fourth mobile node 110(4) stored in the header 677 and further includes the original multicast packet 605. The routing module 170 of the third router 150(3) thereafter delivers the first packet 665 and the second packet 675, respectively, to the third and fourth mobile nodes 110(3-4).

Thus, based on the above description, one or more embodiments of the present invention efficiently transmit multicast packets to mobile nodes 110(1-6) that may have moved to foreign subnets 145(1-2). As described, in one embodiment, instead of sending a separate multicast packet for each mobile node 110 that is away from the home subnet 140, the HA module 135 and the routing module 170 attempt to transmit a common packet to the mobile nodes 110 as far along the path as possible before individual packets are forwarded to the mobile nodes 110(1-4). This can reduce the number of packets that need to be transmitted by the home agent 130, thereby reducing network traffic.

Figure 8:
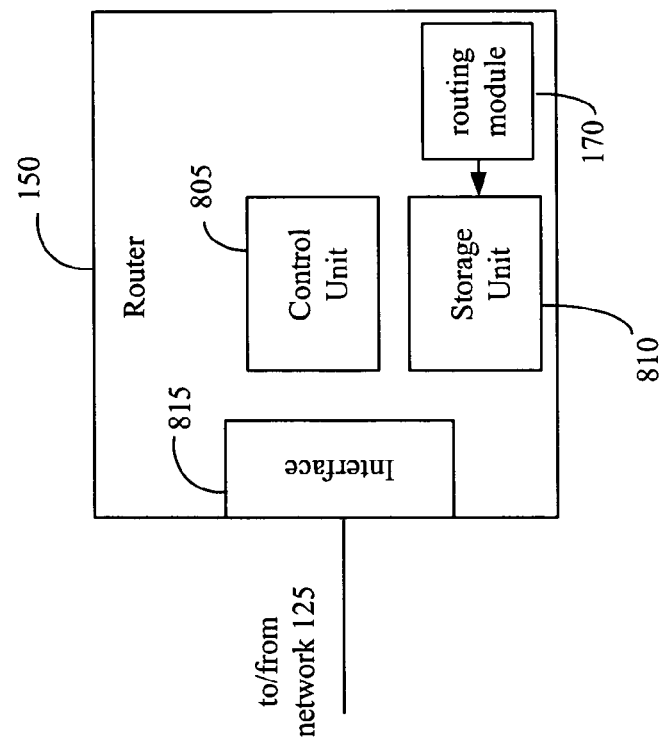
FIG. 8 depicts a block diagram of a router that may be employed in the communications system of FIGS. 1A-B, in accordance with one embodiment of the present invention.

Referring now to FIG. 8, a stylized block diagram of the router 150 that may be implemented in the communications system of FIG. 1B is illustrated, in accordance with one embodiment of the present invention. The router 150 includes a control unit 805 that is communicatively coupled to a storage unit 810, which has the routing module 170 stored therein. The control unit 805 performs overall functions for the router 150, including executing one or more module(s) stored in the storage unit 810. The router 150 includes an interface 815 that is communicatively coupled to the control unit 805. The control unit 805 communicates with other devices coupled to the network 125 via the interface 815. In one embodiment, the home agent 130 of FIG. 1A may also take the form of the router 150 of FIG. 8, and, as such, the HA module 135 can be stored in the storage unit 810.

Figure 9:
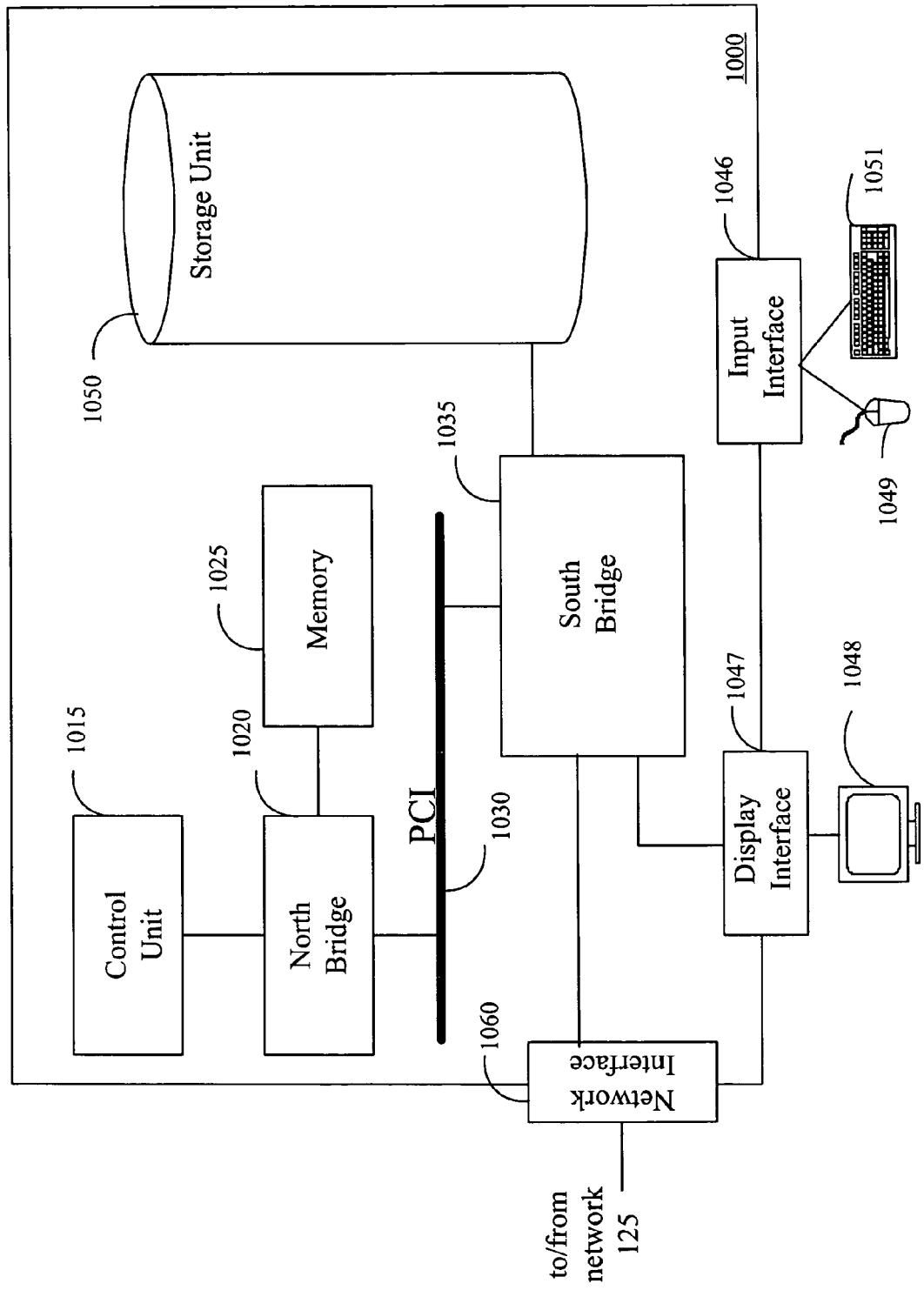
FIG. 9 depicts a block diagram of a processor-based device that may be employed in the communications systems of FIGS. 1A and 1B, in accordance with one embodiment of the present invention.

Referring now to FIG. 9, a stylized block diagram of a processor-based device 1000 that may be implemented in the communications system of FIG. 1 is illustrated, in accordance with one embodiment of the present invention. That is, the processor-based device 1000 may represent one embodiment of the transmitting host 105 or the home agent 130 of FIG. 1B. The processor-based device 1000 comprises a control unit 1015, which in one embodiment may be a processor that is capable of interfacing with a north bridge 1020. The north bridge 1020 provides memory management functions for a memory 1025, as well as serves as a bridge to a peripheral component interconnect (PCI) bus 1030. In the illustrated embodiment, the processor-based device 1000 includes a south bridge 1035 coupled to the PCI bus 1030.

A storage unit 1050 is coupled to the south bridge 1035. Although not shown, it should be appreciated that in one embodiment an operating system, such as AIX, Windows®, Disk Operating System®, Unix®, OS/2®, Linux®, MAC OS®, or the like, may be stored on the storage unit 1050 and executable by the control unit 1015. The storage unit 1050 may also include device drivers (not shown) for the various hardware components of the system 1000. If implemented as the home agent 130, the processor-based device 1000 may include the HA module 135 stored in its storage unit 1050.

In the illustrated embodiment, the processor-based device 1000 includes a display interface 1047 that is coupled to the south bridge 1035. The processor-based device 1000 may display information on a display device 1048 via the display interface 1047. The south bridge 1035 of the processor-based device 1000 may include a controller (not shown) to allow a user to input information using an input device, such as a keyboard 1051 and/or a mouse 1049, through an input interface 1046.

The south bridge 1035 of the system 1000, in the illustrated embodiment, is coupled to a network interface 1060, which may be adapted to receive, for example, a local area network card. In an alternative embodiment, the network interface 1060 may be a Universal Serial Bus interface or an interface for wireless communications. The processor-based device 1000 communicates with other devices coupled to the network through the network interface 1060.

It should be appreciated that the configuration of the processor-based device 1000 of FIG. 9 is exemplary in nature and that, in other embodiments the processor-based device 1000 may include fewer, additional, or different components without deviating from the spirit and scope of the present invention. For example, in an alternative embodiment, the processor-based device 1000 may not include a north bridge 1020 or a south bridge 1035, or may include only one of the two bridges 1020, 1035, or may combine the functionality of the two bridges 1020, 1035. As another example, in one embodiment, the processor-based device 1000 may include more than one control unit 1015. Similarly, other configurations may be employed consistent with the spirit and scope of the present invention.

The various system layers, routines, or modules may be executable control units (such as control unit 805, 1015 (see FIGS. 9 and 10)). The control unit 805, 1015 may include a microprocessor, a microcontroller, a digital signal processor, a processor card (including one or more microprocessors or controllers), or other control or computing devices. The storage devices 810, 1050 referred to in this discussion may include one or more machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy, removable disks; other magnetic media including tape; and optical media such as compact disks (CDs) or digital video disks (DVDs). Instructions that make up the various software layers, routines, or modules in the various systems may be stored in respective storage devices 810, 1050. The instructions when executed by a respective control unit 805, 1015 cause the corresponding system to perform programmed acts.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method, comprising:
   receiving a multicast packet directed to a plurality of mobile nodes, the mobile nodes being associated with a home subnet;
   identifying if any of the plurality of mobile nodes are coupled to a subnet other than the home subnet, wherein each of the identified mobile nodes has an associated transmission path through which that mobile node can be reached;
   in response to determining that at least some of the mobile nodes are coupled to the subnet other than the home subnet, determining which of the identified mobile nodes has a common next hop in their associated transmission path;
   generating a packet including at least a portion of the multicast packet and including in the packet a list of mobile nodes that have the common next hop, wherein the packet includes an IP header field allowing insertion of an extension header between the IP header field and a payload portion of the packet, and further wherein the extension header is a hop-by-hop extension header that includes the list of the plurality of mobile nodes to which the multicast packet is directed; and
   transmitting the generated packet to the common next hop.

2. The method of claim 1, wherein the act of generating comprises identifying two or more groups of mobile nodes that have a common next hop and generating a packet for each identified group of mobile nodes.

3. The method of claim 1, wherein the multicast packet includes an associated header and a payload portion, and wherein generating the packet comprises encapsulating the multicast packet within a new header, wherein the new header includes a destination address of at least one of the identified mobile nodes.

4. The method of claim 3, wherein the extension header is accessed by one or more routers included along the transmission path of the mobile nodes.

5. The method of claim 1, further comprising transmitting the multicast packet to the mobile nodes locally coupled to the home subnet.

6. A method, comprising:
   receiving a packet including a multicast packet and a list of a plurality of mobile nodes to which the multicast packet should be delivered, wherein each of the mobile nodes is reachable through its respective transmission path and wherein the packet includes an IP header field containing a hop-by-hop extension header and further wherein the hop-by-hop extension header includes the list of the plurality of mobile nodes to which the multicast packet is directed;
   determining if the plurality of mobile nodes has a common next hop in their transmission path; and
   transmitting the received packet to the common next hop in response to determining that the plurality of mobile nodes has the common next hop.

7. The method of claim 6, further comprising identifying if two or more of the plurality of mobile nodes has a common next hop in their transmission path in response to determining that the plurality of mobile nodes does not have the common next hop.

8. The method of claim 7, further comprising:
generating a packet including at least a portion of the multicast packet and including a list of the identified mobile nodes; and
transmitting the generated packet to the common next hop.

9. The method of claim 8, wherein generating the packet comprises encapsulating the multicast packet within a new header, wherein the new header includes a destination address of at least one of the identified mobile nodes.

* * * * *